United States Patent
Mori et al.

(10) Patent No.: US 6,863,953 B2
(45) Date of Patent: Mar. 8, 2005

(54) SURFACE MATERIAL OF URETHANE RESIN AND A METHOD FOR PREPARATION THEREOF

(75) Inventors: Toshimasa Mori, Shizuoka (JP); Yoshinari Hatori, Shizuoka (JP); Tetsuo Nodera, Aichi (JP); Haruhide Kawai, Shizuoka (JP)

(73) Assignee: Okamoto Industries, Inc., Tokyo (JP)

( * ) Notice: Subject to any disclaimer, the term of this patent is extended or adjusted under 35 U.S.C. 154(b) by 142 days.

(21) Appl. No.: 10/237,607

(22) Filed: Sep. 10, 2002

(65) Prior Publication Data

US 2003/0087084 A1 May 8, 2003

(30) Foreign Application Priority Data

| Sep. 13, 2001 | (JP) | 2001-278041 |
| Jan. 23, 2002 | (JP) | 2002-014042 |
| Feb. 15, 2002 | (JP) | 2002-037838 |
| May 20, 2002 | (JP) | 2002-144379 |

(51) Int. Cl.$^7$ .............................. B32B 5/18; B32B 5/24
(52) U.S. Cl. ...................... 428/141; 428/142; 428/147; 428/151; 428/156; 428/161; 428/308.4; 428/318.4; 428/319.3; 428/423.1; 428/424.2; 428/904; 442/102; 442/221; 442/226; 442/315; 442/370; 442/374
(58) Field of Search .......................... 428/15, 141, 142, 428/147, 151, 156, 161, 423.1, 424.2, 904, 318.4, 308.4, 319.3; 442/102, 221, 226, 315, 370, 374

(56) References Cited

U.S. PATENT DOCUMENTS

| 4,190,572 A | * | 2/1980 | Nishimura et al. ........ 264/46.4 |
| 4,206,255 A | * | 6/1980 | Wenzel et al. ........... 427/393.5 |
| 5,422,186 A | * | 6/1995 | Biggeleben et al. ..... 428/423.3 |
| 2003/0190438 A1 | * | 10/2003 | Suzuki et al. ................. 428/15 |

* cited by examiner

Primary Examiner—Ula Ruddock
(74) Attorney, Agent, or Firm—Sherman & Shalloway

(57) ABSTRACT

The present invention provides a surface material which can be replaced to the conventional surface material made of soft polyvinylchloride resin. This surface material is useful for the various uses such as the material for car interior, surface material furniture or the material for porches. The present invention is the urethane resin surface material comprising, a mixed resin sheet composed of 50–95 wt. % thermoplastic polyurethane and 50–5 wt. % of acrylic soft resin and the Shore A hardness of said urethane resin surface material is 60–80. On one side surface of the mixed resin sheet, a layer of knitted, woven, nonwoven fabric or soft foam sheet can be provided. As the thermoplastic polyurethane resin, the thermoplastic polyurethane resin of Shore A hardness 65–90 is desirable, and as the acrylic soft resin, the acrylic soft resin of Shore A hardness 50–80 is desirable.

11 Claims, No Drawings

SURFACE MATERIAL OF URETHANE RESIN AND A METHOD FOR PREPARATION THEREOF

FIELD OF THE INVENTION

The present invention relates to a surface material used as the material for car interior, material of motorcycle saddle or surface material for furniture such as chair, more in detail relates to a formable surface material comprising a sheet made of mixed resin of thermoplastic polyurethane and acrylic soft resin or a surface material prepared by laminating a fabric or a foam sheet to the rear surface of said sheet. Further, the present invention relates to the method for preparation of said surface material.

BACKGROUND OF THE INVENTION

As the surface material for car interior such as door, seat, ceiling, headrest, tonneau cover, sun visor or instrument panel, surface material of motorcycle saddle, surface material for pouch or surface material for furniture such as chair or settee, a soft polyvinylchloride sheet is conventionally used. And as the surface material, a leather prepared by forming a soft polyvinylchloride layer on the surface of a sheet substrate such as woven, knitted or non woven fabric or polyolefin foam.

Soft polyvinylchloride has a broad variety in it's hardness. The type of soft polyvinylchloride which is used for the ordinary sheet or film is the polyvinylchloride having hardness which when 30–50 weight parts of plasticizer (diethylhexylphthalate) is blended to 100 parts of polyvinylchloride indicates. And, as the soft polyvinylchloride to be used as the surface material for inner door car interior, the polyvinylchloride having hardness which when 70–100 weight parts of plasticizer is blended to 100 parts of polyvinylchloride indicates, that is, fairly soft type is used.

Recently, in connection with the recycling of the resources, the use of polyolefin resin such as random polyethylene, ethylene-vinylacetate resin, hydrogenated styrene-butadiene rubber, further the use of thermoplastic polyurethane instead of soft type polyvinylchloride is proposed, and the leather which uses these mentioned resins is also proposed.

However, when compared with soft type polyvinylchloride, polyolefin leather has following problems. Namely, the surface is easily injured, does not have adaptability to a high frequency welder and does not have sufficient softness. Still more, polyolefin leather has further problem that because the flame resistance of it is not so good, it is necessary to blend a flame retarding agent such as phosphoric acid type or boric acid type to pass the regulation.

The applicant of the present application already proposed acrylic resin leather possessing an acrylic soft resin layer at least one surface of a substrate as a surface material which has softness, is excellent in resistance for surface injuring and is the material which can be processed by a high frequency welder (JPA2000-349405). This acrylic resin leather is excellent as the synthetic resin leather which can take the place of conventional soft polyvinylchloride leather, however, has a problem that a small injury can easily magnifies is pointed out. That is, when the leather is sewed up by a sewing machine, the seam line is easily magnified or the leather tears from the seam line.

The physical property of thermoplastic polyurethane leather is rubber-like and has strong elasticity, while, has no natural softness caused by retarded elasticity which soft polyvinylchloride has, therefore, the feeling of it is inferior to that of soft polyvinylchloride. Further, for the purpose to obtain good softness, it is necessary to blend a plasticizer by high blending ratio, and the plasticizer blended by large blending ratio causes a problem of transference or bloom. Further the problem of poor calendar processability is also pointed out.

Usually, as the thermoplastic polyurethane leather, the leather prepared by forming a thermoplastic polyurethane layer on a substrate using an intermediate of soft polyurethane foam layer is well known. As the method to form a thermoplastic polyurethane layer on a substrate using an intermediate of soft polyurethane foam layer, various methods can be substantially mentioned. In the case, when a foamed soft polyurethane molded foam is used, the poor adhering power of said foam with a substrate or a thermoplastic polyurethane layer caused by a skin layer which said foam has is recognized as a problem. And, by the method which coats an unfoamed polyurethane layer over the surface of a substrate, and piles up a layer of thermoplastic polyurethane on it, then makes said unfoamed polyurethane layer foam, the uniform product can not be obtained, further, there is a problem that the deterioration of urethane by heating is remarkable.

The object of the present invention is to provide a surface material which can take the place of the conventional surface material which uses soft polyvinylchloride sheet. Namely, the object of the present invention is to provide a sheet shaped surface material of polyurethane resin which is suited for the vacuum forming or blow forming and to provide a method for preparation thereof. Further, the object of the present invention is to provide an urethane resin surface material prepared by laminating a knitted fabric, a woven fabric or soft polyurethane slab foam layer to the reverse surface, which is characterized by having high tearing strength, the seam line is not easily magnified or does not tear from the seam line when sewed up by a sewing machine, having good emboss transcribing feature, having good softness and resistance to surface injuring and can be processed by a high frequency welder, and another object is to provide a method for preparation thereof.

BRIEF SUMMARY OF THE INVENTION

The present invention is an urethane resin surface material comprising, a mixed resin sheet composed of 50–95 wt. % of thermoplastic polyurethane and 50–5 wt. % of acrylic soft resin and Shore A hardness of said urethane resin surface material is 60–80. Further, the present invention is an urethane resin surface material comprising a substrate on one surface of which a mixed resin layer composed of 50–95 wt. % of thermoplastic polyurethane and 50–5 wt. % of acrylic soft resin is arranged and Shore A hardness of said mixed resin layer is 60–80. As the substrate, woven fabric, knitted fabric, nonwoven fabric or soft foam sheet can be used.

Further, the present invention is an urethane resin surface material comprising, a mixed resin layer composed of 50–95 wt. % of thermoplastic polyurethane and 50–5 wt. % of acrylic soft resin whose Shore A hardness is 60–80 and a soft polyurethane slab foam layer, wherein the surface of said mixed resin layer is embossed, further said soft polyurethane slab foam layer is compressed to the 10–60% thickness to the original thickness. To the reverse surface of this soft polyurethane slab foam, woven fabric, knitted fabric, nonwoven fabric can be laminated.

As a thermoplastic polyurethane mentioned above, the thermoplastic polyurethane of Shore A hardness 65–90 is desirably used and as an acrylic soft resin, the acrylic soft resin of Shore A hardness 50–80 is desirably used. And to said mixed resin, a plasticizer can be blended.

Furthermore, the present invention is the method for preparation of the urethane resin surface material comprising, forming the mixed resin composed of 50–95 weight parts of thermoplastic polyurethane of Shore A hardness 65–90 and acrylic soft resin of Shore A hardness 50–80 to a sheet by calendar processing. Still more, the present invention is the method for preparation of urethane resin surface material comprising, forming the mixed resin composed of 50–95 weight parts of thermoplastic polyurethane of Shore A hardness 65–90 and acrylic soft resin of Shore A hardness 50–80 to a sheet by calendar processing, then laminating said sheet with a substrate and forming one body.

Still further, the present invention is a method for preparation of the urethane resin surface material comprising, laminating a sheet formed by the calendar process of the mixed resin composed of 50–95 weight parts of thermoplastic polyurethane of Shore A hardness 65–90 and 50–5 weight parts of acrylic soft resin of Shore A hardness 50–80 upon a surface of soft polyurethane slab foam sheet or upon a surface of soft polyurethane slab foam sheet lined with woven fabric, knitted fabric or nonwoven fabric, heating and pressing said laminated product using an emboss roller so as the laminated product to become one body and simultaneously stamping the embossed pattern on the surface of thermoplastic layer, and compressing the soft polyurethane slab foam layer to the 10–60% thickness to the original thickness.

In the above mentioned method for preparation of urethane resin surface material of the present invention, to the mixed resin, a plasticizer can be blended and also (meth) acrylic polymer can be blended too, further calcium carbonate can be blended. Furthermore, 1–15 weight parts of melamine cyanulate can be blended to 100 weight parts of mixed resin. By blending these components, calendar processability can be improved.

DETAILED DESCRIPTION OF THE INVENTION

The present invention is an urethane resin surface material comprising, a mixed resin sheet composed of 50–95 wt. % of thermoplastic polyurethane and 50–5 wt. % of acrylic soft resin and the Shore A hardness of said urethane resin surface material is 60–80. In the present invention, the term of Shore A hardness is the value measured in accordance with ASTM D 4420 (measuring temperature is 23° C.).

The thermoplastic polyurethane can be obtained by the reaction between diisocyanate compound and the compound having more than two of hydroxyl group. Especially, polyurethane thermoplastic elastomer (TPU) composed of long chain polyol, diisocyanate and a chain extending agent, that is, composed of soft segment and hard segment. Among these kind of elastomers, the one of Shore A hardness of 65–95 is desirably used, and the one of Shore A hardness of 70–80 is more desirably used.

As the isocyanate compound which is used to synthesis thermoplastic polyurethane, tolylenediisocyanate, diphenylmethanediisocyanate, naphthalenediisocyanate, tolydinediisocyanate, hexamethylenediisocyanate, hydrogenated xylenediisocyanate, hydrogenated dicyclohexylmethane-diisocyanate or isophoronediisocyanate can be mentioned.

Further, as the compound having more than two of hydroxyl group, polyester polyol which is a condensation reaction product of dibasic acid e.g. adipic acid or phthalic acid and glycol e.g. ethyleneglycol or 1,4-butanediol; polycarbonate polyol which is the reaction product of carbonate e.g. ethylene carbonate and glycol; polyetherpolyol e.g. polyethyleneglycol, polypropyleneglycol, polytetramethyleneglycol or polyethyleneglycol-polypropyleneglycol can be used. From the view point of the physical property of the sheet shaped forming material, it is desirable to use polyether polyol. And the use of polyether polyol is further desirable, because the thermoplastic polyurethane whose starting material is polyether polyol has a good resistance to aging and a good calendar processability.

As a chain extending agent, lower molecular weight polyhydric alcohol such as ethyleneglycol, 1,2-propyleneglycol, 1,3-propyleneglycol, butane1,2-diol, butane1,3-diol, butane1,4-diol, butane2,3-diol or hexanediol, diamine or water can be used.

The acrylic soft resin used in the present invention is the resin which displays softness at the normal temperature such as soft polyvinylchloride. This acrylic soft resin is desirable to be a polymer of multi layer structure, that is, the granular polymer characterizing more than two kinds of acrylic soft resin are forming core-shell type multi layer structure. These acrylic soft resins shows good softness at the normal temperature, has good resistance against bending and has good resistance to weather. Further, the acrylic soft resin of Shore A hardness 50–80 is desirable, especially of Shore A hardness 55–65 is more desirable.

One substantial example of acrylic soft resin used in the present invention is shown as follows. 10–90 weight parts of polymer layer [A] having at least one layer prepared by polymerization of monomer mixture composed of 30–99.9 wt. % of at least one kind of acrylic acid alkyl ester having an alkyl group of carbon number 1–12, 0–70 wt. % of at least one kind of methacrylic acid alkyl ester having an alkyl group of carbon number 1–8, 0–30 wt. % of co-polymerable unsaturated monomer and 0.1–10 wt. % of poly functional bridgeable monomer and/or poly functional graft polymer whose Tg is lower than 30° C., and 90–10 weight parts of polymer layer [B] having at least one layer prepared by polymerization of monomer mixture composed of 30–99 wt. % of at least one kind of acrylic acid alkyl ester having an alkyl group of carbon number 1–12, 1–70 wt. % of at least one kind of methacrylic acid alkyl ester having an alkyl group of carbon number 1–8 and 0–30 wt. % of co-polymerable unsaturated monomer whose Tg is from −20 to 50° C., and the outermost layer is the polymer layer [B].

Another substantial example of acrylic soft resin is shown as follows. An acrylic soft resin of multi layered structure composed of 30–80 weight part of rubber layer obtained by polymerizing 60–99.5 wt. % of acrylic acid alkyl ester having an alkyl group of carbon number 1–8, 0–39.5 wt % of mono functional monomer having one co-polymerable vinyl group and 0.5–50 wt. % of poly functional monomer having at least two vinyl group or vinylidene group and 20–70 weight part of hard resin layer obtained by polymerizing 40–100 wt. % of methylmethacrylate, 0–60 wt. % of acrylic acid alkyl ester having alkyl group of carbon number 1–8 and 0–20 wt. % of monomer having co-polymerable vinyl group or vinylidene group, further the outermost layer is a hard resin layer.

Further, other substantial example of acrylic soft resin is shown as follows. An acrylic soft resin of multi layered structure composed of (A) 5–30 weight parts of innermost hard polymer layer obtained by polymerizing 80–98.99 wt. % of methylmethacrylate, 1–20 wt. % of acrylic acid alkyl ester having an alkyl group of carbon number 1–8; (B) 20–45 weight parts of intermediate hard polymer layer obtained by polymerizing 70–99.5 wt. % of acrylic acid alkyl ester having an alkyl group of carbon number 1–8, 0–30 wt. % of methylmethacrylate, 0.5–5 wt. % of polyfunctional grafting agent and 0–5 wt. % of polyfunctional crosslinking agent; (C) 50–75 weight parts of outermost hard polymer layer obtained by polymerizing 90–99 wt. % of methylmethacrylate, 10–1 wt. % of acrylic acid alkyl ester having an alkyl group of carbon number 1–8 whose average particle size is 0.01–0.3 $\mu$m.

In the mixed resin of the present invention, the blending ratio of thermoplastic polyurethane and acrylic soft resin is, 50–95 wt. % of thermoplastic polyurethane and 60–5 wt. % of acrylic soft resin, desirably is 60–90 wt. % of thermoplastic polyurethane and 40–10 wt. % of acrylic soft resin and more desirably 70–90 wt. % of thermoplastic polyurethane and 30–10 wt. % of acrylic soft resin. If the blending ratio of thermoplastic polyurethane is smaller than 50 wt. %, tearing strength is not sufficient and the resin is easily torn, while the blending ratio of thermoplastic polyurethane is over than 95 wt. %, the feeling becomes hard and not desirable, further, the processing temperature at calendaring process becomes higher and causes the problem of decomposing.

To the mixed resin of the present invention composed of thermoplastic polyurethane and acrylic soft resin, a plasticizer can be blended. By blending a plasticizer, softness of and touch of the sheet can be improved. Further, the blending of plasticizer can decrease the processing temperature at the calendar process of the mixed resin, accordingly the decomposition of thermoplastic polyurethane at the calendar processing can be controlled. As the plasticizer, phthalic acid ester such as di2-ethylhexylphthalate, isobuthylphthalate or diisodecylphthalate; trimellitic acid ester such as tri-2ethylhexyltrimellitate; fatty acid dibasic acid ester such as di-2ethylhexyladipate, di-isononyladipate or di-2ethylhexylsebacate; epoxy plasticizer such as epoxidated soybean oil or butylepoxystearate, phosphoric acid ester such as tricresyl phosphate, citric acid ester such as tributylacetylcitrate can be used. Among these compounds, aromatic carboxylic acid ester such as phthalic acid ester or trimellitic acid ester can be desirably used, from the view point of high plasticizing effect and the problem such as bleeding is few. The blending amount of the plasticizer is 0–50 weight parts to 100 weight parts of mixed resin and desirably is 3–20 weight parts. The large blending amount of the plasticizer is not desirable, because the problems of transference and bleeding occur.

To the mixed resin, a slipping agent, an ultra violet ray absorbing agent, a light stabilizer, a pigment and an antibacteria agent which are used as the ordinal additives for synthetic resin can be blended if necessary. As the slipping agent, metallic salt of fatty acid such as calcium, magnesium, zinc or barium salt of stearic acid, polyethylene wax, stearic acid, alkylene bis fatty acid amide can be used. As the ultra violet ray absorbing agent benzotriasol U.V. ray absorbing agent such as 2-(2'-hydroxy-5'-methylphenyl) benzotriazol can be used. As the light stabilizer, hinderd amine light stabilizer such as bis-(2,2,6,6-tetramethyl-4-piperidil)sebacate can be used. As the antibacteria agent, silver inorganic antibacteria agent can be used.

The surface material which uses the mixed resin of the present invention as the material, indicates hardness of 60–80 by Shore A hardness. By accomplishing this hardness, the surface material having same softness, same touch and same feeling to the surface material made of soft polyvinylchloride prepared by blending 70–100 weight parts of plasticizer (diethylhexylphthalate) to 100 weight parts of polyvinylchloride can be obtained.

The sheet shaped surface material of the present invention is produced by following process. That is, for example, thermoplastic polyurethane and acrylic soft resin are mixed in accordance with the prescribed ratio, then additives such as plasticizer or slipping agent are added if necessary and kneaded well. After that, formed to sheet shape of 0.1–1.0 mm thickness by calendering or by extruding. Further, if necessary, it is possible to provide marble print or to coat a delustering agent such as silicone denatured polycarbonate-polyurethane or to provide a pattern by a pattern roller.

As the method to form said mixed resin to a sheet, a calendering process is desirable, and by blending (meth)acrylic polymer to the mixed resin, the melting tension can be adjusted and calendering process becomes smooth. For example, this (meth)acrylic polymer is desirable to be the copolymer whose molecule weight is 500,000–5,000,000 obtained by copolymerization of 50–90 wt. % of methylmethacrylate and 50–5 wt. % of other ethylene unsaturated monomer which can copolymerize with said methylmethacrylate. As the other ethylene unsaturated monomer, for example, methacrylic acid ester of alcohol whose carbon number is 2–18, acrylic acid ester of alcohol whose carbon number is 2–18, styrene, a-methylstyrene, acrylonitrile, maleic acid or itaconic acid can be mentioned. The blending ratio of (meth)acrylic polymer is 10–30 weight parts, desirably 2–10 weight parts to 100 weight parts of mixed resin.

Further, the adherence at the calendar processing can be reduced by adding inorganic powder such as calcium carbonate, antimony oxide, colloidal silica, magnesium silicate or magnesium hydroxide to the mixed resin mentioned above, and accordingly it is possible to carry out the calendaring process smoothly. Especially, calcium carbonate is desirably used. The blending amount of the inorganic compound is 0–30 weight parts, desirably is 5–20 weight parts to 100 weight parts of the mixed resin. Furthermore, in the case of transcribe forming (heat transcription, simultaneous transcription with forming), when pattern transcribing feature is too poor, the pattern transcribing feature can be improved by blending a resin which has adequate softness at ordinary temperature and has high melting tension at high temperature such as hydrogenated NBR (acrylonitrile-butadiene rubber) or ABS (acrylonitrile-butadiene-styrene copolymer).

Still further, by blending melamine cyanurate to the mixed resin mentioned above, the calendar processability can be improved. And, by blending melamine cyanurate to the mixed resin, the recycle use of the resin can be possible. That is, the sheet formed by calendering can be a final product by cutting off the selvage parts of both sides of the sheet, and conventionally the selvage parts can not be reused because of the quality problem, and this point is recognized as the problem to increase the production cost. However, when melamine cyanurate is blended to the mixed resin, said selvage parts can be processed by calendering again and can be a sheet of high quality. The blending amount of melamine cyanurate is 1–15 weight parts, desirably 3–10 weight parts to 100 weight parts of the mixed resin. When the blending amount is under 1 weight part, the effect of melamine cyanurate can not be displayed, and when the blending amount is over than 15 weight parts, the mixed resin becomes brittle, and in the case when it is used as the surface material, since it has a problem to break from the seam or the cut line, further the crank becomes easily expand, therefore, is not desirable.

The surface material of the present invention composed of a sheet of the mixed resin, is suited to be formed by vacuum forming or by blow forming. And can be used as a surface material for the inner door car interior (seat, headrest, tonneau cover, sun visor, door or ceiling), surface material for inner door, surface material of motorcycle saddle or surface material for furniture (chair or settee). Especially, it is suited for the preparation of an instrument panel of car.

In the case of an instrument panel for car, when an instrument panel having soft feeling, good touch and high-grade image is required, it is usual to form by a slush forming method. That is, first of all, the surface layer is formed by a slush forming method, then the aggregate is arranged. Foaming liquid such as polyurethane is poured between surface material and aggregate and foamed, thus the instrument panel is prepared. In the case of the present invention, the surface material is formed to the shape of the instrument panel by vacuum forming method, and can form to the instrument panel by making it one body with the aggregate through the medium of foam such as polyurethane foam or polyolefin foam. This instrument panel has soft feeling, good touch and high-grade image and is the same type product to the instrument panel formed by slush forming method.

Further, the present invention is an urethane surface material characterized by providing a mixed resin layer composed of 50–60 wt. % of thermoplastic polyurethane and 50–5. wt. % of acrylic soft resin and whose Shore A hardness is 60–80 on one surface of the substrate.

In this urethane surface material, above mentioned mixed resin and additives can be used. As the substrate, woven, knitted or non woven fabric can be used. As the starting material of these knitted or woven fabric, polyamide fiber, polyester fiber, acrylic fiber, polypropylene fiber, cotton, rayon or mixed spinning yarn thereof can be mentioned. As the knitted fabric, interlock stitch fabric or plain stitch fabric can be used, and as the woven fabric, plain weeve fabric, twill fabric or satin fabric can be used. And, as a substrate, a soft foam sheet can also be used. As the soft foam sheet, polypropylene foam, polyethylene foam, electronically crosslinked polyethylene foam or polyurethane foam can be mentioned. Further, as the substrate, laminated sheet composed of woven, knitted or non woven fabric with soft foam sheet can be used. In this case, it is desirable to have a structural feature of knitted or woven fabric—soft foam sheet—mixed resin layer.

The surface material with above mentioned substrate can be used as the surface material for the inner door car interior (seat, headrest, tonneau cover, sun visor, door or ceiling), surface material for inner door, surface material of motorcycle saddle or surface material for furniture (chair or settee). And also used as the synthetic resin leather, material for pouch e.g. bag, raincoat or apron. And the leather which uses soft foam sheet as a substrate can be used as the car interior (instrument panel, door or ceiling). Further, the surface material prepared by providing a mixed resin layer on both surfaces of knitted or woven fabric substrate can be used as the material for a flexible container.

The surface material with above mentioned substrate can be prepared as follows. That is, for example, thermoplastic polyurethane and acrylic soft resin are mixed together by the prescribed ratio and add additives such as plasticizer or slipping agent if necessary, kneaded well then formed to the sheet of 0.1–5 mm thickness by a calendar machine or by an extruding machine, thus a mixed resin sheet is prepared. On the surface of knitted or woven fabric, which is a substrate, adhesive is coated, above mentioned mixed resin sheet is piled on the surface to which adhesive is coated and slightly heated and pressed, and adhered not to be shifted. Then provide the marble print at need, delustering agent is coated, then the sheet is heated to 150–200° C. and pressed by a pattern roller. By this pressing process, the substrate and the mixed resin sheet becomes one body and a surface material is obtained. It is also possible to provide a mixed resin layer on the both surface of knitted or woven fabric substrate. Further, it is possible to prepare a surface material by following process. Namely, adhesive is coated on the surface of soft foam sheet such as polypropylene foam sheet or polyurethane foam sheet, and form a mixed resin layer on the soft foam sheet according to the method mentioned above. Especially, in the case when urethane foam sheet is used as the soft foam sheet, it is possible to make it one body without adhesive.

For adhering of substrate with mixed resin sheet, ethylene-vinylacetate copolymer emulsion, polyvinylchloride vinyl paste or 2 liquid type polyurethane adhesive can be used. These adhesive can be coated on the surface of substrate or on the surface of mixed resin sheet. For the adhering of the substrate and polypropylene foam sheet, and adhering of polypropylene foam sheet and mixed resin sheet, it is possible to provide a primer layer such as polyurethane primer layer or epoxy resin primer layer on the surface of laminated surface of polypropylene foam sheet to improve the adhering ability.

Further, the present invention is an urethane resin surface material comprising, a mixed resin layer composed of 50–95 wt. % of thermoplastic polyurethane and 50–5 wt. % of acrylic soft resin and the Shore A hardness of said urethane resin surface material is 60–80 and a soft polyurethane slab foam layer, wherein the surface of said mixed resin layer is embossed and said soft polyurethane slab foam layer is compressed to the 10–60% thickness to the original thickness.

As the mixed resin and additives, afore mentioned resin and additives are used. And a thermoplastic polyurethane can be used alone instead of the mixed resin. Further, the soft polyurethane slab foam layer is composed of foam sheet obtained by cutting soft polyurethane slab foam prepared by ordinary method to the proper thickness. Soft polyurethane, which is the starting material, can be prepared from polyether polyol or polyester polyol mentioned below and diisocyanete such as tolylenediisocyanate. In the present invention, polyether polyol is, for example, polyethylene addition product of polyethyleneglycol, polypropyleneglycol or glycerin (molecular weight 3000–4000). And, polyester polyol is polyester whose both end are hydroxyl group, obtained by condensation reaction of polyol such as ethyleneglycol, propyleneglycol or sorbitol and dicarboxylic acid such as oxalic acid, succinic acid or maleic acid. By the use of soft polyurethane slab form sheet obtained by cutting slab formed soft polyurethane foam to a proper thickness, emboss transcribing feature and adhering ability with thermoplastic urethane resin can be improved. Desirably, the density of this soft polyurethane slab foam sheet is 10–50 $kg/cm^3$.

This soft polyurethane slab foam layer can be a single layer, or can be lined with woven, knitted or non woven fabric. The material of these woven, knitted or non woven fabric is polyamide fiber, polyester fiber, acrylic fiber, polypropylene fiber, cotton, rayon or mixed spinning yarn thereof. As the knitted fabric, interlock stitch fabric or plain stich fabric can be used, and as the woven fabric, plain weeve fabric, twill fabric or satin fabric can be used. As the substantial method to laminate a woven, knitted or non woven fabric to a soft polyurethane slab foam sheet, a flame lamination method or an adhering method by hot-melt film can be preferably used, because the use of liquid type adhesive deteriorate the touch of the laminated product. The surface material lined with woven, knitted or non woven fabric can be seamed. Further, in the present invention, elastic woven, knitted or non woven fabric can be used as the woven, knitted or non woven fabric. The surface material lined with said elastic woven, knitted or non woven fabric is suited for the vacuum or blow forming.

The surface material with a slab foam layer of the present invention is excellent at so called adhering ability and high frequency welder adaptability and is suited to the surface material for the inner door car interior (seat, headrest, tonneau cover, sun visor, door or ceiling), surface material for inner door, surface material of motorcycle saddle or surface material for furniture (chair or settee). And the surface product lined with woven, knitted or non woven fabric is suited to the product to be finished by seam, while the surface product lined with elastic woven, knitted or non woven fabric is suited to the product to be formed by the vacuum or blow forming.

The surface material with a slab foam layer of the present invention can be prepared by following method. That is, for example, to the mixed resin of prescribed ration of thermoplastic polyurethane and acrylic soft resin, additives such as plasticizer or slipping agent are blended, kneaded well, then formed to a sheet of 0.1–1.0 mm thickness by a calendar forming or by a extruding forming, thus the thermoplastic urethane resin sheet is prepared. In the meanwhile, the slab of soft polyurethane slab formed to 10–50/m$^3$ density is cut to the thickness of 1–5 mm and the soft polyurethane slab foam sheet is prepared. Then lined with woven, knitted or non woven fabric if necessary.

On the surface of soft urethane slab foam sheet, above mentioned thermoplastic urethane resin sheet is piled on, then marble print is provided if necessary. A delustring agent is coated and the sheet is heated to 150–200° C. and pressed by a pattern roller. By this pressing process, the sheet is laminated and become one body, and the surface material composed of thermoplastic urethane resin layer and soft polyurethane slab foam layer on the surface of which emboss is performed can be obtained. At the pressing process, the thickness of soft polyurethane slab foam sheet is compressed to 10–60% thickness to the original thickness. By this compressing process, the surface material which is superior at adhering ability, emboss transcribing feature and feeling can be obtained. In the case when the sheet is compressed to the thickness smaller than 10% to the original thickness, the product lacks the feeling as a foamed product of the surface material. And in the case when the soft polyurethane sheet is pressed to 10–40% to the original thickness, the good product as the surface material can be obtained. Further, the case when the thickness of the pressed sheet is over 60% to the original thickness, craters are observed on the surface and the product becomes easily buckled (when the surface material is bent, it is not bent naturally but causes deep creases) and the value as a commodity is lost.

EXAMPLES

The present invention will be illustrated more readily according to the Examples and Comparative Examples, however, not intending to restrict the scope of the claims of the invention.

Examples 1–5, Comparative Examples 1, 2

Thermoplastic polyurethane (UHE-75A: product of Mitsubishi Chemical Co., Ltd., polyurethane using polyetherpolyol, Shore A hardness 77), thermoplastic polyurethane (UE-80: product of Mitsubishi Chemical Co., Ltd., polyurethane using polyetherpolyol, Shore A hardness 80), acrylic soft resin (SA-1000P: product of KURARAY Co., Ltd., Shore A hardness 70), methylmethacylate-acrylic acid alkyl copolymer (Mathaburene P-530 A: product of Mitsubishi Rayon Co., Ltd.), calcium carbonate (NS-A: Nitto Funka Kogyo Co., Ltd.), antioxidant (PEP-36: product of Asahi Denka Kogyo Co., Ltd.), plasticizer (#124: product of Kao Co., Ltd., phtalic ester), slipping agent (polyethylene wax), U.V. ray absorbing agent (benzotriazol), light stabilizer (HALS) and pigment are blended according to the blending ratio of Examples 1–5 and Comparative Example 1, 2 mentioned in Table 1 (numbers indicates weight parts) and processed by a calendar machine at each calendar processing temperature and formed to a sheet of 0.4 mm thickness, thus the surface material is obtained.

The surface injuring feature, cold resistance, high frequency welder adaptability, elasticity, roller processability, heat resistance and light resistance of surface material sheets obtained in Examples 1–5 and Comparative Example 1, 2 are measured. The results are summarized in Table 1. The surface materials obtained in Example 1–5 show good vacuum forming ability.

TABLE 1

|  | Example | | | | | Comparative Example | |
| --- | --- | --- | --- | --- | --- | --- | --- |
|  | 1 | 2 | 3 | 4 | 5 | 1 | 2 |
| UHE-75A | 90 | 80 | 70 | 50 | — | 100 | — |
| UE-80 | — | — | — | — | 80 | — | — |
| SA-1000P | 10 | 20 | 30 | 50 | 20 | — | 100 |
| Methaburene P-530A | 5 | 5 | 5 | 5 | 5 | 10 | 10 |
| Calcium carbonate | 10 | 10 | 10 | 10 | 10 | 10 | 10 |
| Anti-oxidant agent | 0.3 | 0.3 | 0.3 | 0.3 | 0.3 | 0.3 | 0.3 |
| Plasticizer | — | — | — | — | 10 | — | — |
| Slipping agent | 0.5 | 0.5 | 0.5 | 0.5 | 0.5 | 0.5 | 0.5 |
| U.V. ray absorbing agent | 0.7 | 0.7 | 0.7 | 0.7 | 0.7 | 0.7 | 0.7 |
| Light stability | 0.3 | 0.3 | 0.3 | 0.3 | 0.3 | 0.3 | 0.3 |
| Pigment | trace | trace | trace | trace | trace | trace | trace |
| Calendar processing temperature (° C.) | 170 | 165 | 165 | 160 | 155 | 175 | 165 |
| Test |  |  |  |  |  |  |  |
| Surface injuring | ○ | ○ | ○ | ○ | ○ | ○ | ○ |
| Cold resistance (° C.) | −50 | −50 | −40 | −30 | −50 | −50 | −20 |
| High frequency welder adaptability | ○ | ○ | ○ | ○ | ○ | ○ | ○ |
| Softness (feeling) | Δ–○ | ⊚ | ⊚ | ○ | ○ | Δ | Δ–X |
| Roller processability | Δ–○ | ○ | ○ | ○ | ○ | X | ○ |
| Heat resistance (class) | 4 | 5 | 5 | 5 | 4 | 4 | 5 |
| Light resistance (class) | 4 | 5 | 5 | 5 | 4 | 3 | 5 |
| Shore A hardness | 76 | 74 | 74 | 71 | 76 | 77 | 70 |

In Table 1, the surface injuring feature is measured in accordance with JIS K 7204. In the measurement, CS-10 abrasion wheel is used, and the load is 1 kgf×2000 times.

In cold resistance, the lowest temperature which passes JIS K 6772 standard is shown.

At the measuring of high frequency welder adaptability, the specimen is fuse adhered by a weldering machine on the market and the adherence of the mixed resin is estimate by a removing tester. ○: material is broken at removing process, X: removed at the surface at removing process.

Softness is measures as follows. Namely, the specimens prepared as above are touched by hand, and the feeling of each specimens are estimated in comparison with that of surface material sheet of soft polyvinylchloride (polyvinylchloride prepared by blending 100 weight parts of diethylhexyl-phthalate plasticizer to 100 weight parts of polyvinylchloride) sheet. ○: has same feeling to that of soft polyvinylchloride surface material, Δ: has slightly harder feeling than soft polyvinylchloride surface material, X: has hard feeling and can not be replaced with soft polyvinylchloride surface material.

Roll processability is estimated by estimating agglomerating property after 30 minutes by maintaining calendaring temperature (raised to the proper fusing temperature). ○: properly adherent, Δ: slightly adherent, X: adherent.

Heat resistance is estimated by measuring the color change after left in the atmosphere of 110° C. for 500 hours.

Light resistance is estimated by measuring the color change after exposure to U.V. ray carbon arc type light resistance testing machine of 83° C. black panel temperature for 300 hours based on JIS-B-7751.

Example 6

Two sheets of 0.4 mm thickness prepared in Example 1 are laminated and embossed, and a luster adjusting agent of silicone denatured polycarbonate polyurethane is coated and the surface material is obtained. The surface material is formed to the shape of an instrument panel by vacuum molding and the aggregate is arranged. Foamable liquid polyurethane is poured between formed surface material and the aggregate. The liquid polyurethane is foamed and an instrument panel is prepared. The instrument panel having soft feeling and high-grade can be obtained.

Examples 7–11, Comparative Examples 3, 4

The components of Examples 1–5 shown in Table 1 are blended and formed to a sheet of 0.25 mm thickness by a calendaring machine under the calendar processing temperature mentioned in Table 1. In Example 7, the components and calendar processing temperature of Example 1 is used. In Example 8, the components and calendar processing temperature of Example 2 is used. In Example 9, the components and calendar processing temperature of Example 3 is used. In Example 10, the components and calendar processing temperature of Example 4 is used. In Example 11, the components and calendar processing temperature of Example 5 is used. In Comparative Example 3, the components and calendar processing temperature of Comparative Example 1 is used. In Comparative Example 4, the components and calendar processing temperature of Comparative Example 2 is used.

Ethylene-vinylacetate emulsion adhesive is coated on the surface of plain stitch fabric knitted using mixed spinning yarn of rayon and polyester fiber (mixing ratio is rayon 7: polyester fiber 3). To the surface to which adhesive is coated, above mentioned calendar processed sheets are piled on and slightly heated and pressed, and adhered not to be shifted. Then the sheet is heated to the temperature of 180° C. and pressed by a pattern roller and a rubber roller. The plain stitch fabric and the mixed resin sheet become one body and the leather type surface material with a pattern of the present invention is obtained.

Surface injuring feature, cold resistance, high frequency welder adaptability, elasticity, roller processability, heat resistance and light resistance of surface material sheets obtained in Examples 7–11 and Comparative Example 3, 4 are almost same to the results of Examples 1–5. And magnifying of seam line of these surface materials is estimated. This estimation is carried out as follows. Namely, specimens of each surface material are tested as the covering material of chair, and stretched over the chair and sewed up, then the state of seam is inspected by the naked eye of the inspector. In the cases of Examples 7–11 and Comparative Example 3, magnifying of seam line is not observed. On the contrary, in the case of Comparative Example 4, the seam line is magnified and there is no value as a commodity.

Example 12

The thermoplastic urethane resin sheets used in Examples 12–19, and Comparative Examples 5, 6 are prepared by following method.

Thermoplastic polyurethane (UHE-75A: product of Mitsubishi Chemical Co., Ltd., polyurethane using polyetherpolyol, Shore A hardness 77), thermoplastic polyurethane (UE-80: product of Mitsubishi Chemical Co., Ltd., polyurethane using polyetherpolyol, Shore A hardness 80), aclyric soft resin (SA-1000P: product of KURARAY Co., Ltd., Shore A hardness 70), methylmethacylate-acrylic acid alkyl copolymer (Mathaburene P-530 A: product of Mitsubishi Rayon Co., Ltd.), calcium carbonate (NS-A: Nitto Funka Kogyo Co., Ltd.), antioxidant (PEP-36: product of Asahi Denka Kogyo Co., Ltd.), plasticizer (#124: product of Kao Co., Ltd., phtalic ester), slipping agent (polyethylene wax), U.V. ray absorbing agent (benzotriazol), light stabilizer (HALS) and pigment are blended according to the blending ratio of Examples 12–20 and Comparative Example 5, 6 mentioned in Table 2 (numbers indicates weight parts) and processed by a calendar machine at each calendar processing temperature and formed to a sheet of 0.15 mm thickness, thus the surface material is obtained.

On the surface of polyether soft polyurethane slab foam sheet (500EA: product of Kurabo Co., Ltd.) of 3 mm thickness and 40 kg/cm$^3$ density, a thermoplastic urethane resin sheet of 0.15 mm thickness mentioned in Example 12 of Table 2 is piled up and heated to 180° C. then passed through an emboss roller. Thus the emboss process and the heat lamination process are carried out simultaneously. Emboss process is carried out on the surface of thermoplastic urethane resin sheet. The properly emboss transcribed surface material of 1.0 mm thickness [soft polyurethane slab foam sheet layer is compressed to approximately 0.85 mm (28% to the original thickness) thickness] is obtained. This surface material is fitted as the covering surface material for motorcycle saddle. The thickness of soft polyurethane slab foam sheet is measured by measuring a sliced and exposed section of sheet with a calipers.

Example 13

A sheet of hot melt film (product of Aicello Chemical Co., Ltd.), a polyether soft polyurethane slab foam sheet of 3 mm thickness and 40 kg/cm$^3$ density and a thermoplastic urethane resin sheet of 0.15 mm thickness mentioned in Example 13 of Table 2 are piled up on the surface of smooth knit fabric made of polyester-rayon mixed spinning yarn of 30 yarn count, and heated to 180° C., passed through an embossed roller, and the emboss process and the heat lamination process of 4 layers are carried out simultaneously. Emboss process is carried out on the surface of thermoplastic urethane resin sheet. The properly emboss transcribed surface material of 1.2 mm thickness [soft polyurethane slab foam sheet layer is compressed to approximately 0.75 mm (25% to the original thickness) thickness] is obtained. This surface material is fitted as a sewing surface material of a chair.

Example 14

On the surface of polyester soft polyurethane slab foam sheet of 3 mm thickness and 30 kg/cm³ density (40M5: product of Kurabo Co., Ltd.), a plain stitch fabric knitted using wooly nylon yarn of 0.2 mm thickness is frame laminated. To the surface of soft polyurethane slab foam layer of said laminate, a thermoplastic urethane resin sheet mentioned in Example 14 of Table 2 of 0.15 mm thickness is piled up, heated to 180° C., then passed through an embossed roller and the emboss process and the heat lamination process are carried out simultaneously. Emboss process is carried out on the surface of thermoplastic urethane resin sheet. The properly emboss transcribed surface material of 1.1 mm thickness [soft polyurethane slab foam sheet layer is compressed to approximately 0.75 mm (25% to the original thickness) thickness] is obtained. This surface material is fitted as a surface material of a motorcycle saddle to be processed by a high frequency welding machine.

Example 15

A polyether soft polyurethane slab foam sheet of 3 mm thickness and 40 kg/cm³ density and a thermoplastic urethane resin sheet of 0.15 mm thickness mentioned in Example 15 of Table 2 (urethane adhesive is coated to the reverse surface) are piled up on the surface of plain weeve fabric using 210 denier polyurethane spandex yarn, and heated to 180° C., passed through an embossed roller and the emboss process and the heat lamination process are carried out simultaneously. The emboss process is carried out on the surface of thermoplastic urethane resin sheet. The properly emboss transcribed surface material of 1.2 mm thickness [soft polyurethane slab foam sheet layer is compressed to approximately 0.75 mm (25% to the original thickness) thickness] is obtained. This surface material is fitted as a surface material of a motorcycle saddle to be formed by a vacuum forming.

Example 16

A polyether soft polyurethane slab foam sheet of 3 mm thickness and 40 kg/cm³ density and a thermoplastic urethane resin sheet of 0.15 mm thickness mentioned in Example 16 of Table 2 are piled up on the surface of polyurethane spun-bond nonwoven fabric of 0.31 mm thickness (Espansione UHF80: product of Kanebo Gosen Co., Ltd.) use urethane adhesive, heated to 180° C., passed through an embossed roller, and thus the emboss process and the heat lamination process are carried out simultaneously. The emboss process is carried out on the surface of thermoplastic urethane resin sheet. The properly emboss transcribed surface material of 1.2 mm thickness [soft polyurethane slab foam sheet layer is compressed to approximately 0.74 mm (25% to the original thickness) thickness] is obtained. This surface material is fitted as a surface material of a motorcycle saddle to be formed by a vacuum forming.

Examples 17–19, Comparative Examples 5, 6

On a polyether soft polyurethane slab foam sheet of 3 mm thickness and 40 kg/cm³ density, a thermoplastic urethane resin sheets of 1.5 mm thickness mentioned in Examples 17–19 and Comparative Examples 5, 6 are respectively piled up and heated to 180° C., passed through an embossed roller, and the emboss process and the heat lamination process are carried out simultaneously. The emboss process is carried out on the surface of thermoplastic urethane resin sheet. The roll gap condition at the emboss process is altered respectively and the surface materials of Examples 17–19 and Comparative Examples 5, 6 are prepared.

Further, the thickness of surface material and thickness of foam sheet layer of Examples 12–19 and Comparative Examples 5, 6 are measured. The remaining thickness ratio of foam sheet (that is, percent of the thickness of foam layer after embossed to the thickness foam sheet layer before embossed) is calculated. Further the feeling of surface material is inspected. The obtained results are summarized in Table 2.

TABLE 2

|  | Example | | | | | | | | Comparative Example | |
| --- | --- | --- | --- | --- | --- | --- | --- | --- | --- | --- |
|  | 12 | 13 | 14 | 15 | 16 | 17 | 18 | 19 | 5 | 6 |
| UHF-75A | 90 | 80 | 70 | 50 | — | 80 | 80 | 80 | 80 | 80 |
| UE-80 | — | — | — | — | 80 | — | — | — | — | — |
| SA-1000P | 10 | 20 | 30 | 50 | 20 | 20 | 20 | 20 | 20 | 20 |
| Methaburene P-530A | 5 | 5 | 5 | 5 | 5 | 5 | 5 | 5 | 5 | 5 |
| Calcium carbonate | 10 | 10 | 10 | 10 | 10 | 10 | 10 | 10 | 10 | 10 |
| Anti-oxidant agent | 0.3 | 0.3 | 0.3 | 0.3 | 0.3 | 0.3 | 0.3 | 0.3 | 0.3 | 0.3 |
| Plasticizer | — | — | — | — | 10 | — | — | — | — | — |
| Slipping agent | 0.5 | 0.5 | 0.5 | 0.5 | 0.5 | 0.5 | 0.5 | 0.5 | 0.5 | 0.5 |
| U.V. ray absorbing agent | 0.7 | 0.7 | 0.7 | 0.7 | 0.7 | 0.7 | 0.7 | 0.7 | 0.7 | 0.7 |
| Light stability | 0.3 | 0.3 | 0.3 | 0.3 | 0.3 | 0.3 | 0.3 | 0.3 | 0.3 | 0.3 |
| Pigment | trace | trace | trace | trace | trace | trace | trace | trace | trace | trace |
| Calendar processing temperature (° C.) | 170 | 165 | 165 | 160 | 155 | 165 | 165 | 165 | 165 | 165 |
| Thickness of surface material after embossed (mm) | 1.0 | 1.2 | 1.1 | 1.2 | 1.2 | 0.45 | 1.65 | 2.25 | 0.3 | 2.55 |
| Thickness of foam sheet after embossed (mm) | 0.85 | 0.75 | 0.75 | 0.75 | 0.74 | 0.3 | 1.2 | 1.80 | 0.15 | 2.10 |
| Remaining thickness ratio of foam sheet (%) | 28 | 25 | 25 | 25 | 25 | 10 | 40 | 60 | 5 | 70 |
| Feeling of surface material | good | good | good | good | good | good | good | * | ** | *** |

*Few craters are observed. Buckling is observed.
**Feeling is bad
***Craters are observed. Heavy buckling is observed Examples 20–28, Comparative Examples 7–8

Thermoplastic polyurethane (UHE-75A: product of Mitsubishi Chemical Co., Ltd., polyurethane using polyetherpolyol, Shore A hardness 77), aclyric soft resin (SA-1000P: product of KURARAY Co., Ltd., Shore A hardness 70), methylmethacylate-acrylic acid alkyl copolymer (Mathaburene P-530A: product of Mitsubishi Rayon Co., Ltd.), calcium carbonate, antioxidant (phenol type), U.V. ray absorbing agent (benzotriazol), light stabilizer (hindered amine type), sodium perchlorate, slipping agent (polyethylene wax), plasticizer (phtalic ester), pigment and melamine cyanurate (MC-610, MC-640: Product of Nissan Chemicals Co., Ltd.) are blended according to the blending ratio of Examples 20–28 and Comparative Example 7, 8 mentioned in Table 3 (number indicates weight parts) and resin compositions are prepared.

Referring to these resin compositions, Shore A hardness and rolling ability are measured. At the measurement of rolling ability, the temperature that the resin composition reaches to the hardness fitted to the calendar processing is measured at first. At said measured temperature, pair test rollers (gap is 0.3 mm) are used and 100 g of each compounds is rolled and bleed out of the roller surface and slipping feature (adhering feature) are inspected every 5 minutes and the longest time which does not affect the calendar process is recorded. The results are summarized in Table 3. If the result is over than 45 minute, the calendar process can be carried out stable, further is over than 60 minutes, the selvage parts of both sides of the sheet can be reused in the calendar processing.

surface material is superior in surface injuring, cold resistance, high frequency welder adaptability, softness, roller processability, heat resistance and light resistance.

Possibility for the Industrial Use

The surface material of the present invention composed of 50–95 wt. % of thermoplastic polyurethane and 50–5 wt. % of acrylic soft resin has good softness further is excellent at touch and feeling similary to the surface material of soft polyvinylchloride sheet. And is fitted to vacuum forming or blow forming. Furthermore, it is excellent at restoring ability, heat resistance, light resistance, cold resistance, resistance to surface injuring and has a merit that it can be fuse processed by a high frequency welder.

And the surface material of the present invention prepared by lining said mixed resin sheet with substrate such as knitted or woven fabric has not only above mentioned merit but also has merits that when it is sewed up by a sewing machine, the seam line is not easily magnified or it does not tear from the seam line. That is, it can be used as the surface material which can be used instead of the conventional soft polyvinylchloride sheet. Further, the surface material of the present invention lined with soft polyurethane slab foam sheet has not only above mentioned merit but also has merits that beautiful and durable emboss pattern can be stamped because of it's good emboss transcribing ability.

The surface material of the present invention is useful for the various uses, such as the material for car interior, the surface material of furniture or the material for porches. When the surface material of the present invention is pre-

TABLE 3

|  | Example | | | | | | | | | Comparative Example | |
| --- | --- | --- | --- | --- | --- | --- | --- | --- | --- | --- | --- |
|  | 20 | 21 | 22 | 23 | 24 | 25 | 26 | 27 | 28 | 7 | 8 |
| UHE-75A | 80 | 80 | 80 | 80 | 80 | 80 | 80 | 80 | 80 | 80 | 80 |
| SA-1000P | 20 | 20 | 20 | 20 | 20 | 20 | 20 | 20 | 20 | 20 | 20 |
| Methaburene P-530A | 5 | 5 | 5 | 5 | 5 | 5 | 5 | 5 | 5 | 5 | 5 |
| Anti-oxidant agent | 0.3 | 0.3 | 0.3 | 0.3 | 0.3 | 0.3 | 0.3 | 0.3 | 0.3 | 0.3 | 0.3 |
| U.V. ray absorbing agent | 0.7 | 0.7 | 0.7 | 0.7 | 0.7 | 0.7 | 0.7 | 0.7 | 0.7 | 0.7 | 0.7 |
| Light stabilizer | 0.3 | 0.3 | 0.3 | 0.3 | 0.3 | 0.3 | 0.3 | 0.3 | 0.3 | 0.3 | 0.3 |
| Sodium perchlorate | 0.5 | 0.5 | 0.5 | 0.5 | 0.5 | 0.5 | 0.5 | 0.5 | 0.5 | 0.5 | 0.5 |
| Calcium carbonate | 10 | 10 | 10 | 10 | 10 | 10 | 10 | 10 | 10 | 10 | 10 |
| Slipping agent | 0.5 | 0.5 | 0.5 | 0.5 | 0.5 | 0.5 | 0.5 | 0.5 | 0.5 | 0.5 | 0.5 |
| Plasticizer | 5 | 10 | 5 | 10 | 5 | 5 | 15 | 20 | 5 | — | 5 |
| Pigment | trace | trace | trace | trace | trace | trace | trace | trace | trace | trace | trace |
| MC-610 | 5 | 5 | — | — | 3 | 1 | 5 | 5 | 15 | — | — |
| MC-640 (test) | — | — | 5 | 10 | — | — | — | — | — | — | — |
| Rolling temp (° C.) | 165 | 163 | 165 | 163 | 165 | 165 | 165 | 160 | 165 | 165 | 165 |
| Rolling (min.) | 60< | 60< | 60< | 60< | 50 | 45 | 60 | 60 | 60< | 40 | 40 |
| Hardness: Shore A | 71 | 69 | 71 | 70 | 70 | 70 | 66 | 63 | 73 | 72 | 70 |

Example 29

The resin composition of Example 20 is formed to a sheet of 0.25 mm thickness by calendar forming. Urethane adhesive is coated on the surface of a plain stitch knitted fabric made of polyester fiber. To the surface to which adhesive is coated, above mentioned sheet is piled on, slightly heated and pressed, and adhered not to be shifted. Then the sheet is heated to 180° C. and pressed by a pattern roller of ordinary temperature and a rubber roller. The plain stitch knitted fabric and the mixed resin sheet become one body and the leather type surface material with pattern is obtained. This pared by calendar processing, the calendar processability can be improved by blending melamine cyanurate to the mixed resin.

What is claimed is:

1. An urethane resin surface material comprising, a mixed resin sheet composed of
   50–95 wt. % of thermoplastic polyurethane having a Shore A hardness of 65–90 and
   50–5 wt. % of acrylic soft resin having a Shore A hardness of 50–80 formed by calendaring or by extruding and
   Shore A hardness of said urethane resin surface material is 60–80.

2. The urethane resin surface material according to claim 1, wherein the mixed resin contains a plasticizer.

3. An urethane resin surface material comprising a substrate on one surface of which a mixed resin layer composed of
- 50–95 wt. % of thermoplastic polyurethane having a Shore A hardness of 65–90 and
- 50–5 wt. % of acrylic soft resin having a Shore A hardness of 50–80 formed by calendaring or by extruding is arranged and
- Shore A hardness of said mixed resin layer is 60–80.

4. The urethane resin surface material of claim 3, wherein the substrate is woven or knitted fabric or non woven fabric.

5. An urethane resin surface material of claim 3, wherein the substrate is a soft foam sheet.

6. The urethane resin surface material according to claim 3, wherein the mixed resin contains a plasticizer.

7. An urethane resin surface material comprising, a mixed resin layer composed of 50–95 wt. % of thermoplastic polyurethane and 50–5 wt. % of acrylic soft resin whose Shore A hardness is 60–80 and a soft polyurethane slab foam layer, wherein the surface of said mixed resin layer is embossed, further said soft polyurethane slab foam layer is compressed to the 10–60% thickness to the original thickness.

8. The urethane resin surface material of claim 7, wherein the reverse surface of soft polyurethane slab foam layer is lined with a layer of woven fabric, knitted fabric, or non-woven fabric.

9. The urethane resin surface material according to claim 7, wherein the thermoplastic polyurethane has a Shore A hardness of 65–90.

10. The urethane resin surface material according to claim 7, wherein the acrylic soft resin has a Shore A hardness of 50–80.

11. The urethane resin surface material according to claim 7, wherein the mixed resin contains a plasticizer.

* * * * *